US005690811A

United States Patent [19]
Davis et al.

[11] Patent Number: 5,690,811
[45] Date of Patent: Nov. 25, 1997

[54] METHOD FOR EXTRACTING OIL FROM OIL-CONTAMINATED SOIL

[75] Inventors: Robert Mitchell Davis, Ft. Worth; James Mark Paul, DeSoto, both of Tex.

[73] Assignee: Mobil Oil Corporation, Fairfax, Va.

[21] Appl. No.: 544,236

[22] Filed: Oct. 17, 1995

[51] Int. Cl.$^6$ .................................................. C10G 1/04
[52] U.S. Cl. ........................... 208/428; 208/13; 208/390; 208/391; 134/1; 134/25.1
[58] Field of Search ............................... 208/390, 428, 208/13, 391; 166/249; 134/25.1, 1

[56] References Cited

U.S. PATENT DOCUMENTS

| | | | |
|---|---|---|---|
| 2,941,908 | 6/1960 | Logan | 134/1 |
| 3,017,342 | 1/1962 | Bulat et al. | 208/11 |
| 4,367,098 | 1/1983 | McCord | 134/1 |
| 4,891,131 | 1/1990 | Sadeghi et al. | 208/390 |
| 5,184,678 | 2/1993 | Pechkov et al. | 166/177 |
| 5,376,182 | 12/1994 | Everett et al. | 134/25.1 |

*Primary Examiner*—Helane Myers
*Attorney, Agent, or Firm*—Malcolm D. Keen

[57] ABSTRACT

A method for extracting oil from oil-contaminated soil containing 2 to 5 wt. % oil, comprising contacting the oil-contaminated soil with a solvent in the presence of sonic energy in the frequency range of 0.5 to 2.0 kHz. Specifically, a solvent is first mixed with the oil-contaminated soil and the mixture is then formed into a slurry of oil-contaminated soil particles suspended in the solvent. Thereafter the oil-contaminated soil slurry is passed through a shaker screen to remove soil particles greater than ¼ inch. The oil-contaminated soil slurry containing the smaller soil particles is then fed into the top of a vertically disposed, substantially rectangular shaped, hollow acoustic chamber of uniform cross-section. Fresh solvent is injected into the bottom of the acoustic chamber that flows upwardly through the acoustic chamber. The fresh solvent is injected at a rate low enough whereby the oil-contaminated soil particles fall by gravity through the upwardly flowing solvent. The oil-contaminated soil particles and solvent in the acoustic chamber are subjected to acoustic energy in the frequency range of 0.5 to 2.0 kHz displaces the oil from the oil-contaminated soil particles that is dissolved by the upwardly flowing solvent without cavitation of the solvent. The substantially oil-free soil particles containing only 0.2 to 0.4 wt. % oil are recovered from the bottom of the acoustic chamber and spread over the land for land farming. The present method may also be used for extracting oil from oily sludge or oil-based drill cuttings.

33 Claims, 2 Drawing Sheets

METHOD FOR EXTRACTING OIL FROM OIL-CONTAMINATED SOIL

FIELD OF THE INVENTION

This invention relates to a method for extracting oil from oil-contaminated soil using a solvent and sonic energy in the low frequency range of 0.5 to 2.0 kHz.

BACKGROUND OF THE INVENTION

Oil-contaminated soil, drill cuttings and other materials are wide spread in North America. The contamination level is high enough, 2 to 5 wt. % oil, that the solids must be put aside, or in storage, awaiting some remedial action. Many methods have been devised to remove the oily contamination, but most are expensive and usually still leave the solids residue partially oil contaminated. This condition results in removal to designated landfills where transportation and storage costs are high.

Applicant's copending application, Mobil Docket No. 7758, entitled "Method for Extracting Bitumen From Tar Sands" and commonly assigned, discloses a method similar to the present invention for extracting bitumen from tar sands using a solvent and sonic energy in the low frequency range of 0.5 to 2.0 kHz.

U.S. Pat. No. 2,973,312 discloses a method of removing oil from sand, clay and the like, including employing ultrasonic vibration.

U.S. Pat. Nos. 4,054,505 and 4,054,506 disclose a method of removing bitumen from tar sand using ultrasonic energy.

U.S. Pat. No. 4,151,067 discloses a method for removing oil from shale by applying ultrasonic energy to a slurry of shale and water.

U.S. Pat. No. 4,304,656 discloses a method for extracting oil from shale by employing ultrasonic energy.

U.S. Pat. No. 4,376,034 discloses a method for recovering oil from shale employing ultrasonic energy at frequencies between 300 mHz and 3,000 mHz.

U.S. Pat. No. 4,443,322 discloses a method for separating hydrocarbons from earth particles and sand employing ultrasonic energy in the frequency range of 18 to 27 kHz.

U.S. Pat. Nos. 4,765,885 and 5,017,281 disclose methods for recovering oil from tar sands employing ultrasonic energy in the frequency range of 5 to 100 kHz and 25 to 40 kHz respectively.

U.S. Pat. No. 4,891,131 discloses a method for recovering oil from tar sands employing ultrasonic energy in the frequency range of 5 to 100 kHz.

In contrast to the prior art, in the present invention oil-contaminated soil is mixed with a solvent to form a slurry, the slurry is fed into the top of a vertically disposed acoustic chamber and fresh solvent is injected into the bottom of the acoustic chamber and flows upwardly at a controlled rate whereby the particles of oil-contaminated soil fall by gravity through the solvent and are subjected to sonic energy in the low frequency range of 0.5 to 2.0 kHz, whereby the oil is removed from the soil and dissolved by the upwardly flowing solvent without cavitation of the solvent.

SUMMARY OF THE INVENTION

A method for extracting oil from oil-contaminated soil with a solvent which is miscible with the oil in the soil comprising the steps of:

(a) mixing the oil-contaminated soil with a solvent to form a slurry of oil-contaminated soil suspended in the solvent;

(b) injecting the oil-contaminated soil slurry into the upper end of a vertically disposed, substantially rectangular shaped hollow chamber of uniform cross-section and simultaneously injecting a solvent into the lower end of the hollow chamber that flows upwardly through the hollow chamber at a rate low enough whereby the oil-contaminated soil particles fall by gravity through the upwardly flowing solvent;

(c) subjecting the oil-contaminated soil particles and solvent in the hollow chamber to sonic energy in the frequency range of about 0.5 to 2.0 kHz by means of an acoustic transducer attached to the outer surface of one side of the hollow chamber whereby the oil on the soil particles is displaced therefrom and dissolved by the upwardly flowing solvent without cavitation of the solvent; and (d) recovering the substantially oil-free soil particles.

An object of this invention is to more effectively remove oil from oil-contaminated soil by forming a slurry of oil-contaminated soil particles in a solvent, injecting the slurry into the top of an acoustic chamber, injecting fresh solvent into the bottom of the acoustic chamber that flows upwardly at a controlled rate whereby the particles of oil-contaminated soil fall by gravity through the solvent, and subjecting the particles of oil-contaminated soil and solvent to sonic energy in the frequency range of 0.5 to 2.0 kHz whereby the oil is removed from the soil and dissolved by the upwardly flowing solvent without cavitation of the solvent. It is an advantage of the present invention that the use of sonic energy in the low frequency range of 0.5 to 2.0 kHz and the shape of the acoustic chamber prevents cavitation of the solvent and enables the oil to be more effectively removed from the soil.

DESCRIPTION OF THE PREFERRED EMBODIMENT

Figure 1:
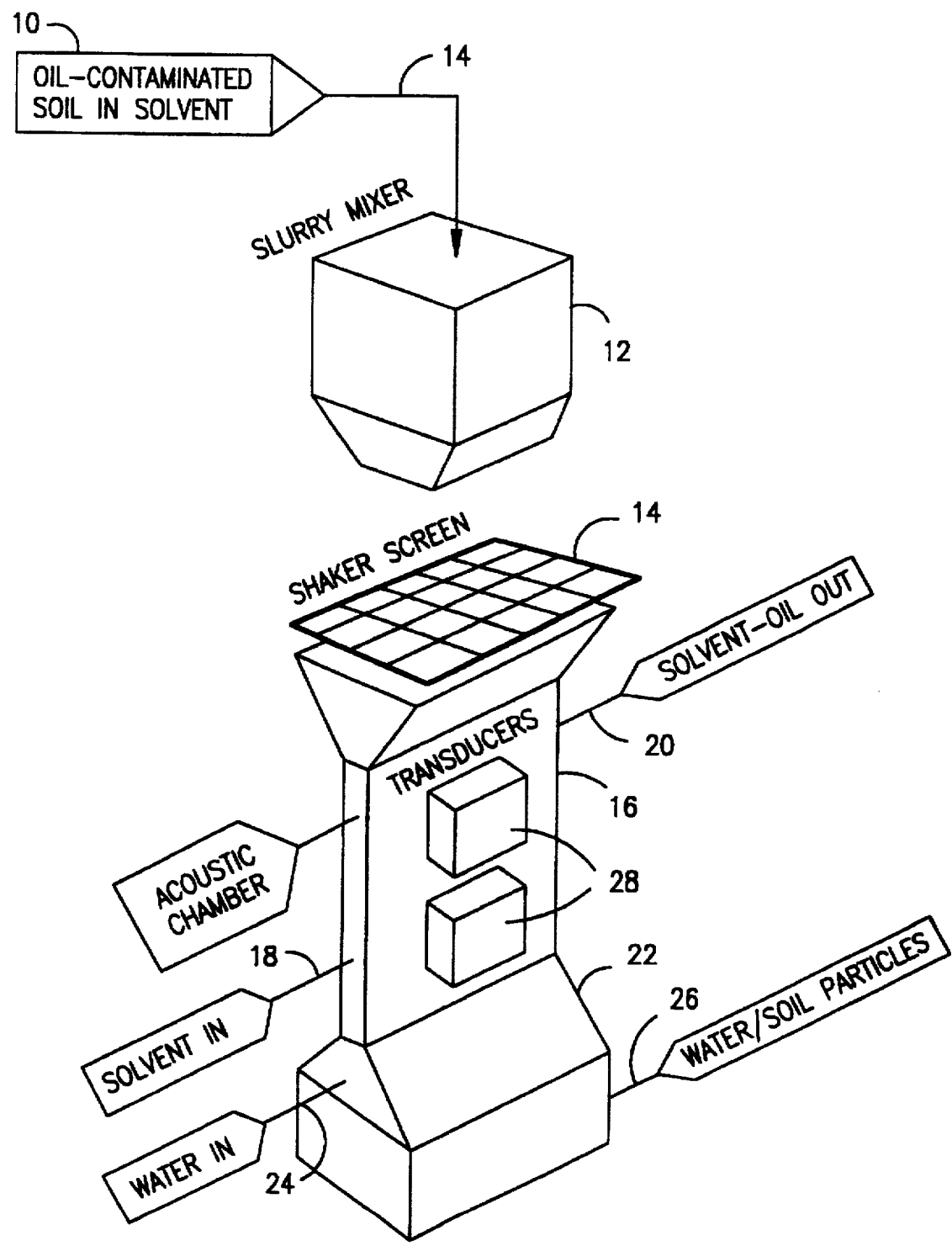
FIG. 1 is a flow sheet schematically illustrating a preferred procedure for extracting oil from oil-contaminated soil in accordance with the invention.

According to the present invention, oil is removed from oil-contaminated soil containing 2 to 5 wt. % oil by a solvent extraction operation enhanced by sonic acoustic energy in the audible frequency range of 0.5 to 2.0 kHz. Referring to FIG. 1, oil-contaminated soil containing 2 to 5 wt. % oil is first mixed with a solvent in tank 10 and the mixture fed into a slurry mixer 12 through line 14. The ratio of oil-contaminated soil to solvent is dependent upon the soil properties. Usually, the operating range of the ratio of oil-contaminated soil to solvent is about 0.3 to 15% by volume and preferably, about 8 to 10% by volume. In the slurry mixer 12, the contaminated soil is thoroughly mixed with the solvent to form a slurry of oil-contaminated soil suspended in the solvent. During the mixing of oil-contaminated soil and solvent a portion of the oil in the soil is dissolved in the solvent and a portion of the solvent is dissolved in the oil remaining in the soil. The oil-contaminated soil slurry is delivered by gravity to a shaker screen 14. Coarse or large soil particles having a particle size greater than ¼ inch are retained on the shaker screen 14 which are delivered from the shaker screen 14 to a crusher (not shown herein) and the crushed soil particles are recycled to tank 10 for mixing with solvent. The oil-contaminated soil slurry containing smaller soil particles equal to or less than ¼ inch is then fed into the top of a vertically disposed, rectangular shaped, hollow acoustic chamber 16 of uniform cross-section. Fresh solvent is fed into the bottom of the acoustic chamber 16 through line 18 and flows upwardly through the acoustic chamber. The fresh solvent is injected into the bottom of the acoustic chamber 16 at a controlled rate low enough whereby the oil-contaminated soil particles in the slurry to fall by gravity through the upwardly flowing solvent. The oil-contaminated soil particles and solvent in the acoustic chamber 16 are subjected to sonic energy in the low frequency range of about 0.5 to 2.0 kHz, preferably 1.25 kHz, that removes the remaining portion of oil from the soil particles thereby permitting the oil to go into solution in the upwardly flowing solvent. The upwardly flowing solvent-plus-oil is removed from the top of the acoustic chamber 16 through line 20. The substantially oil-free soil particles containing 0.2 to 0.4 wt. % oil fall by gravity to the bottom of the acoustic chamber 16 into a tank 22 containing water delivered through line 24. The substantially oil-free soil particles settle in the water to form a slurry of oil-free soil particles suspended in water that is removed through line 26. The slurry of substantially oil-free soil particles in water containing only 0.2 to 0.4 wt. % oil is disposed of by spreading it over land for land farming since the residual oil levels are legally low enough. The use of sonic energy in the low frequency range, the shape of the acoustic chamber, and the counter-current flow of oil-contaminated soil particles and solvent significantly enhances solvent extraction of the oil from the oil-contaminated soil.

The acoustic chamber 16 consists of a vertically disposed, rectangular shaped, hollow chamber of uniform cross sectional area. Preferably, the acoustic chamber 16 is a vertically disposed, rectangular shaped, hollow chamber of uniform cross-section having a first pair of flat parallel sides and a second pair of flat parallel sides wherein the first pair of flat parallel sides is substantially greater in width than the second pair of flat parallel sides. As shown in FIG. 1, the acoustic energy is generated by attaching the transducers 28 to the mid-section of one of the widest side of the acoustic chamber 16. The shape of the acoustic chamber and location of the transducers enable the low frequency sonic energy to be transmitted at the maximum amplitude, or power, without cavitation of the solvent that would possibly interfere with the settling of the oil-contaminated soil particles by gravity through the upwardly flowing solvent. In addition, the use of sonic energy in the low frequency range of 0.5 to 2.0 kHz without cavitation of the solvent more effectively penetrates the oil/soil bond and results in the detachment of the oil from the soil particles which is then dissolved by the upwardly flowing solvent. The acoustic chamber 16 has a volume proportionate to the size and power output of the acoustic transducers.

The sonic energy generated by transducers 28 are of the electrical-acoustic type adapted to convert electrical energy into mechanical vibrations that are introduced into the acoustic chamber 16. The flat surface of the acoustic chamber 16 functions as a plate that contains the acoustic energy. The transducers 28 are magnetostrictive transducers. A suitable transducer is manufactured under the trade designation "T"-Motor® by Sonic Research Corporation, Moline, Ill., that generates sonic vibrations having a frequency within the range of about 0.5 to 10.0 kHz. The transducers 28 consist of a magnetostritive material in the form of rods compressed together and wrapped with a wire coil. The rods comprise 90% iron,5% terbium and 5% dysprosium sold under the trade designation "Terfenol-D" by Edge Technologies, Inc., Ames, Iowa. The Terfenol-D rod is the only material known that can produce variable frequency, and withstand high temperature and pressure. The rods vibrate length wise when a DC current flows through the coil. The induced magnetic field causes the rods to expand and contract, i.e. magnetostrictive motion. This motion, or vibration, generates an acoustic wave or sonic energy having a frequency in the range of 0.5 to 10.0 kHz which extends forward from the transducer for some distance. The transducer is powered by a standard frequency generator and a power amplifier. A suitable transducer for use in the present invention is disclosed in U.S. Pat. No. 4,907,209 which issued to Sewall et al. on Mar. 6, 1990. This patent is incorporated herein by reference. The transducers are powered by a standard frequency generator and a power amplifier. Depending on the resonant frequency of the sonic transducers, the required frequency may range from 0.5 to 2.0 kHz. Operating at the resonant frequency of the sonic source is desirable, because maximum amplitude, or power, is maintained at this frequency. Typically, this frequency is from 0.5 to 2.0 kHz for the desired equipment, preferably 1.25 kHz.

The solvent may be any liquid hydrocarbon that is miscible with the oil in the soil. Suitable solvents include light crude oil or condensate which may be obtained from a nearby oil or gas field or reservoir, raw gasoline, kerosene and toluene or mixtures thereof. The preferred solvent is condensate or light crude oil.

Figure 2:
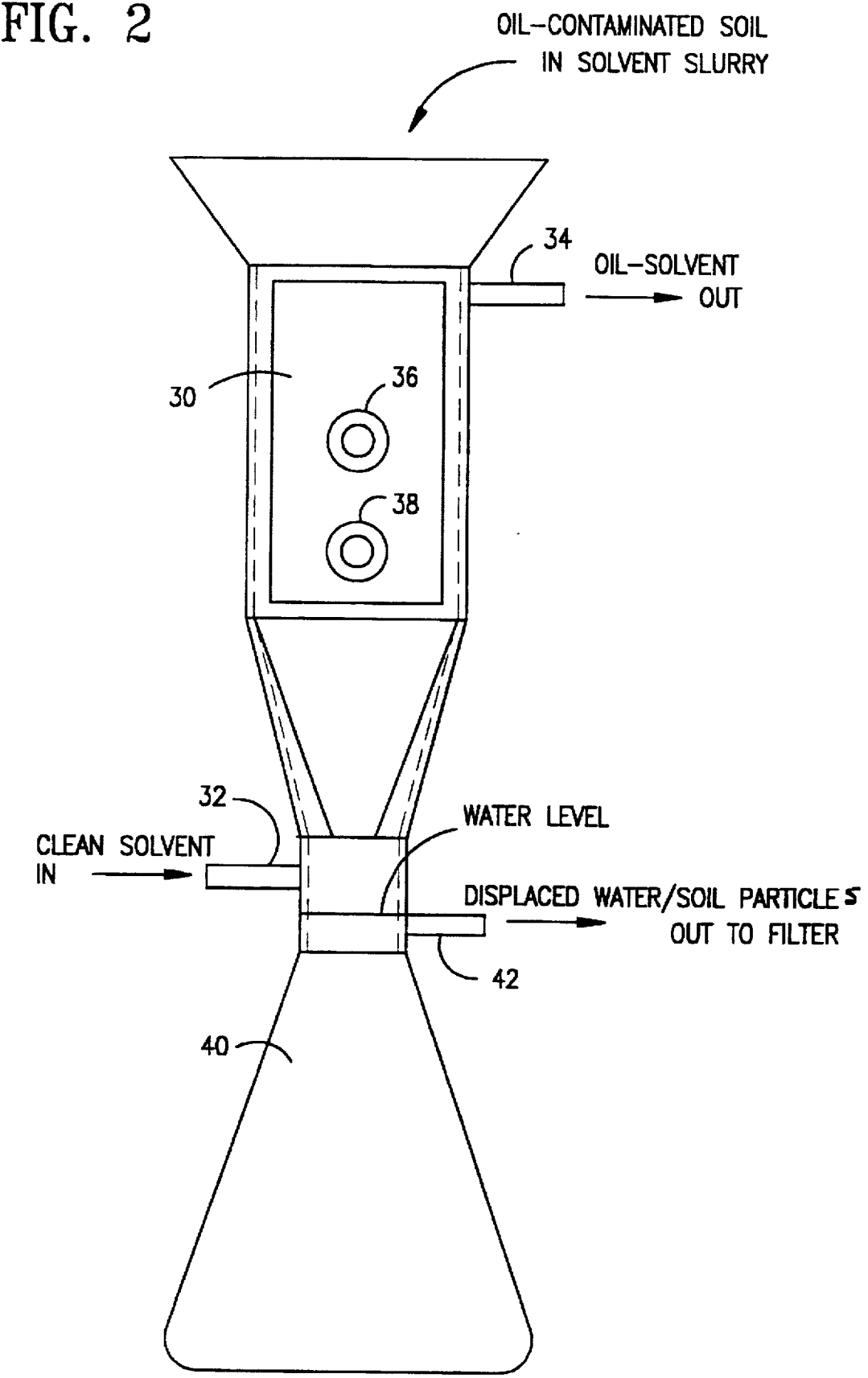
FIG. 2 is a schematic diagram illustrating the laboratory apparatus used according to the present invention.

FIG. 2 illustrates the laboratory solvent extraction testing apparatus. Referring to FIG. 2, a slurry of oil-contaminated soil containing 2.5 to 3.8 wt. % oil suspended in a solvent (toluene) was introduced into the top of acoustic chamber 30. Fresh solvent (toluene) is introduced into the bottom of the acoustic chamber 30 through line 32 and flows upwardly through the acoustic chamber at a controlled rate low enough whereby the oil-contaminated soil particles in the slurry fall by gravity through the upwardly flowing solvent. The oil-contaminated soil particles and solvent in the acoustic chamber 30 are subjected to sonic energy at a frequency of 1.25 kHz and a power level of 6.5. The sonic energy is generated by transducers 36 and 38 attached to the outer surface of the acoustic chamber 30. The low frequency sonic energy removes the oil from the soil particles which is dissolved by the upwardly flowing solvent (toluene) without cavitation of the solvent. The solvent-plus-oil exits from the top of the acoustic chamber 30 through line 34. The substantially oil-free soil particles settle by gravity into flask 40 containing water to form a slurry of substantially oil-free soil particles suspended in water. The water-soil slurry was removed from flask 40 via line 42 and filtered to remove the water. The residual oil from the soil was collected in a Soxhlet extractor using toluene. Alternatively, the soil sample was air-dried overnight at about ambient temperature before Soxhlet extraction to remove any residual solvent.

The operating conditions and results of solvent extractions in conjunction with low frequency sonic energy using the apparatus shown in FIG. 2 are shown in Table 1, below.

TABLE 1

Counter-Current Solvent Extraction of Oily Soil
Oil Content of Soil = 2.5–3.8 wt % (Soxhlet)

| Experiment # | wt. soil, g | Flow Rate Toluene, ml/min | Residual Oil wt. % | Comments |
|---|---|---|---|---|
| 1 | 285 | 18.3 | 1.96 | dry soil |
| 2 | 285 | 18.3 | 0.8 | soil/toluene slurry |
| 3 | 285 | 18.3 | 0.8 | soil/toluene slurry |
| 4 | 285 | 500 | 1.7 | dry soil |
| 5 | 285 | 500 | 0.2 | soil/toluene slurry |
| 6 | 285 | 500 | 0.48 | soil/toluene slurry |

Analysis of the oil-contaminated soil shows that the total amount of oil present in the oil-contaminated soil by wt. percent is 2.5–3.8%. Samples of oily soil weighing 285 grams each were fed by gravity into the top of the acoustic chamber, either alone (dry) or in a slurry of toluene. Runs 1 and 4 indicate the amount of oil extracted from dry soil samples at two different solvent (toluene) flow rates. These results show that the higher solvent (toluene) flow rate increased the amount of extracted oil only slightly.

Runs 2 and 3 are duplicate runs identical to run 1 except that for runs 2 and 3, the sample of oil-contaminated soil was slurried with toluene. These results show that slurrying the soil with toluene significantly increased the amount of oil removed. Run 5 was identical to runs 2 and 3 except for a higher flow rate of toluene. The higher solvent (toluene) flow rate resulted in a residual oil value of only 0.2 wt. % compared to 0.8 wt. % for the lower toluene flow rates in Runs 2 and 3.

In accordance with another embodiment of the invention, the present method may be used to remove oil from oily sludge such as sludge from 2 or 3 separation phases in heat treaters or oil-based drill cuttings. In these embodiments, it would not be necessary to crush these materials or pass the oil-sludge slurry or oil-based drill cuttings slurry through a shaker screen.

We claim:

1. A method for extracting oil from oil-contaminated soil comprising the steps of:
   (a) mixing the oil-contaminated soil with a solvent to form a slurry of oil-contaminated soil particles suspended in the solvent;
   (b) injecting the oil-contaminated soil slurry into the upper end of a vertically disposed, hollow chamber of uniform cross-section and substantially simultaneously injecting fresh solvent into the lower end of the hollow chamber that flows upwardly through the hollow chamber at a controlled rate so that the oil-contaminated soil particles fall by gravity through the upwardly flowing fresh solvent;
   (c) subjecting the oil-contaminated soil particles and solvent in the hollow chamber to sonic energy in the frequency range of about 0.5 to 2.0 kHz without cavitation of the solvent whereby the oil on the soil particles is displaced therefrom and dissolved by the solvent; and
   (d) recovering the substantially oil-free soil particles from the bottom of the hollow chamber.

2. The method of claim 1 wherein the solvent is selected from the group consisting of a light crude oil, condensate, raw gasoline, kerosene and toluene.

3. The method of claim 1 wherein the frequency is 1.25 kHz.

4. The method of claim 1 wherein the oil-contaminated soil in step (a) contains 2.5 to 5.0 wt. % oil.

5. The method of claim 1 wherein the substantially oil-free soil in step (d) contains 0.2 to 0.4 wt. % oil.

6. The method of claim 1 wherein prior to step (b) the oil-contaminated soil slurry is passed through a shaker screen to remove large particles of soil having a particle size of greater than ¼ inch.

7. The method of claim 1 wherein in step (a) the ratio of oil-contaminated soil to solvent is about 0.3 to 15% by volume.

8. A method for extracting oil from oil-contaminated sludge comprising the steps of:
   (a) mixing the oil-contaminated sludge with a solvent to form a slurry of oil-contaminated sludge particles suspened in the solvent;
   (b) injecting the oil-contaminated sludge into the upper end of a vertically disposed, hollow chamber of uniform cross-section and substantially simultaneously injecting fresh solvent into the lower end of the hollow chamber that flows upwardly through the hollow chamber at a controlled rate so that the oil-contaminated sludge particles fall by gravity through the the upwardly flowing fresh solvent;
   (c) subjecting the oil-contaminated sludge particles and solvent in the hollow chamber to sonic energy in the frequency range of about 0.5 to 2.0 kHz without cavitation of the solvent whereby the oil on the sludge particles is displaced therefrom and dissolved by the solvent; and
   (d) recovering the substantially oil-free sludge particles from the bottom of the hollow chamber.

9. The method of claim 8 wherein the solvent is selected from the group consisting of a light crude oil, condensate, raw gasoline, kerosene and toluene.

10. The method of claim 8 wherein the frequency is 1.25 kHz.

11. The method of claim 8 wherein the oil-contaminated sludge in step (a) contains 2.5 to 5.0 wt. % oil.

12. The method of claim 8 wherein the substantially oil-free sludge recovered in step (d) contains 0.2 to 0.4 wt. % oil.

13. The method of claim 8 wherein in step (a) the ratio of oil-contaminated sludge to solvent is about 0.3 to 15% by volume.

14. A method for extracting oil from oil-contaminated drill cuttings comprising the steps of:
   (a) mixing the oil-contaminated drill cuttings with a solvent to form a slurry of oil-contaminated drill cuttings suspended in the solvent;
   (b) injecting the oil-contaminated drill cuttings into the upper end of a vertically disposed, hollow chamber of uniform cross-section and substantially simultaneously injecting solvent into the lower end of the hollow chamber that flows upwardly through the hollow chamber at a controlled rate so that the oil-contaminated drill cuttings fall by gravity through the upwardly flowing fresh solvent;
   (c) subjecting the oil-contaminated drill cuttings and solvent in the hollow chamber to sonic energy in the frequency range of about 0.5 to 2.0 kHz without cavitation of the solvent whereby the oil on the drill cuttings is displaced therefrom and dissolved by the solvent; and
   (d) recovering the substantially oil-free drill cuttings from the bottom of the hollow chamber.

15. The method of claim 14 wherein the solvent is selected from the group consisting of a light crude oil, condensate, raw gasoline, kerosene and toluene.

16. The method of claim 14 wherein the frequency is 1.25 kHz.

17. The method of claim 14 wherein the oil-contaminated drill cuttings in step (a) contain 2.5 to 5.0 wt. % oil.

18. The method of claim 14 wherein the substantially oil-free drill cuttings recovered in step (d) contain 0.2 to 0.4 wt. % oil.

19. The method of claim 14 wherein in step (a) the ratio of oil-contaminated drill cuttings to solvent is about 0.3 to 15% by volume.

20. A method for extracting oil from oil-contaminated soil particles comprising the steps of:
   (a) injecting the oil-contaminated soil particles into the upper end of a vertically disposed, hollow chamber of uniform cross-section containing a solvent and substantially simultaneously injecting fresh solvent into the lower end of the hollow chamber that flows upwardly through the hollow chamber at a controlled rate so that the oil-contaminated soil particles fall by gravity through the upwardly flowing fresh solvent;
   (b) subjecting the oil-contaminated soil particles and solvent in the hollow chamber to sonic energy in the frequency range of about 0.5 to 2.0 kHz without cavitation of the solvent whereby the oil on the soil particles is displaced therefrom and dissolved by the solvent; and
   (c) recovering the substantially oil-free soil particles from the bottom of the hollow chamber.

21. The method of claim 20 wherein the solvent is selected from the group consisting of a light crude oil, condensate, raw gasoline, kerosene and toluene.

22. The method of claim 20 wherein the frequency is 1.25 kHz.

23. The method of claim 20 wherein the oil-contaminated soil contains 2.5 to 5.0 wt. % oil.

24. The method of claim 20 wherein the substantially oil-free soil in step (c) contains 0.2 to 0.4 wt. % oil.

25. The method of claim 20 wherein prior to step (b) the oil-contaminated soil slurry is passed through a shaker screen to remove large particles of soil having a particle size of greater than ¼ inch.

26. A method for extracting oil from oil-contaminated sludge particles comprising the steps of:
   (a) injecting the oil-contaminated sludge particles into the upper end of a vertically disposed, hollow chamber of uniform cross-section containing a solvent and substantially simultaneously injecting fresh solvent into the lower end of the hollow chamber that flows upwardly through the hollow chamber at a controlled rate so that the oil-contaminated sludge particles fall by gravity through the upwardly flowing fresh solvent;
   (b) subjecting the oil-contaminated sludge particles and solvent in the hollow chamber to sonic energy in the frequency range of about 0.5 to 2.0 kHz without cavitation of the solvent whereby the oil on the sludge particles is displaced therefrom and dissolved by the solvent; and
   (c) recovering the substantially oil-free sludge particles from the bottom of the hollow chamber.

27. The method of claim 26 wherein the solvent is selected from the group consisting of a light crude oil, condensate, raw gasoline, kerosene and toluene.

28. The method of claim 26 wherein the frequency is 1.25 kHz.

29. The method of claim 26 wherein the oil-contaminated sludge contains 2.5 to 5.0 wt. % oil.

30. The method of claim 26 wherein the substantially oil-free sludge recovered in step (c) contains 0.2 to 0.4 wt. % oil.

31. A method for extracting oil from oil-contaminated drill cuttings comprising the steps of:
   (a) injecting the oil-contaminated drill cuttings into the upper end of a vertically disposed, hollow chamber of uniform cross-section containing a solvent and substantially simultaneously injecting fresh solvent into the lower end of the hollow chamber that flows upwardly through the hollow chamber at a controlled rate so that the oil-contaminated drill cuttings fall by gravity through the upwardly flowing fresh solvent;
   (b) subjecting the oil-contaminated drill cuttings and solvent in the hollow chamber to sonic energy in the frequency range of about 0.5 to 2.0 kHz without cavitation of the solvent whereby the oil on the drill cuttings is displaced therefrom and dissolved by the upwardly flowing solvent; and
   (c) recovering the substantially oil-free drill cuttings from the bottom of the hollow chamber.

32. The method of claim 31 wherein the solvent is selected from the group consisting of a light crude oil, condensate, raw gasoline, kerosene and toluene.

33. The method of claim 31 wherein the frequency is 1.25 kHz.

\* \* \* \* \*